United States Patent [19]

Takahashi et al.

[11] 4,222,894

[45] Sep. 16, 1980

[54] TITANIUM TRICHLORIDE CATALYTIC COMPONENT AND METHOD FOR HOMO- OR CO-POLYMERIZATION OF α-OLEFIN

[75] Inventors: Yoshikazu Takahashi, Hikari; Shizuo Tomiyasu; Masaru Takitani, both of Shinnanyo, all of Japan

[73] Assignee: Toyo Stauffer Chemical Co., Ltd., Tokyo, Japan

[21] Appl. No.: 925,695

[22] Filed: Jul. 18, 1978

[30] Foreign Application Priority Data

Aug. 31, 1977 [JP] Japan ................................. 52-104349

[51] Int. Cl.$^3$ .............................................. C08F 4/64
[52] U.S. Cl. .................................. 252/429 B; 526/142
[58] Field of Search ......................... 252/429 R, 429 B

[56] References Cited

U.S. PATENT DOCUMENTS

| | | | |
|---|---|---|---|
| 2,965,627 | 12/1960 | Field et al. | 252/429 B X |
| 3,381,047 | 4/1968 | Eleuterio et al. | 252/429 B X |
| 3,701,763 | 10/1972 | Wada et al. | 252/429 B X |
| 4,020,264 | 4/1977 | Hotta et al. | 252/429 B X |

FOREIGN PATENT DOCUMENTS 47-26376  7/1972  Japan .
49-1947  1/1974  Japan .

OTHER PUBLICATIONS

Japanese Patent Laid-Open SHO 48-66098, (66098/73).
Japanese Patent Laid-Open SHO 48-70697, (70697/73).

*Primary Examiner*—Patrick Garvin
*Attorney, Agent, or Firm*—Armstrong, Nikaido, Marmelstein & Kubovcik

[57] ABSTRACT

A titanium trichloride catalytic component manufactured by pulverizing an eutectic mixture or a crystalline compound consisting of titanium trichloride and aluminum chloride or a pulverized matter thereof together with an organic acid or an acid anhydride thereof at a temperature between 35° and 100° C. in the absence of an inert solvent and without any extractive process carried out with such an inert solvent; and a method for carrying out homo-polymerization or co-polymerization of α-olefin by using a catalyst system consisting of the above mentioned titanium trichloride catalytic component and an organoaluminum compound.

18 Claims, No Drawings

TITANIUM TRICHLORIDE CATALYTIC COMPONENT AND METHOD FOR HOMO- OR CO-POLYMERIZATION OF α-OLEFIN

BACKGROUND OF THE INVENTION:

This invention relates to a novel titanium trichloride catalytic component which is highly active on polymerization of α-olefin and a method for advantageously carrying out homopolymerization or copolymerization of α-olefin in the presence of a catalyst system which consists of the catalytic component and an organoaluminum compound, and more particularly to a titanium trichloride catalytic component manufactured by pulverizing an eutectic mixture or a crystalline compound consisting of titanium trichloride and aluminum chloride (hereinafter will be called an eutectic mixture) or a pulverized matter obtained therefrom (hereinafter will be called a titanium trichloride composite in general) together with an organic acid or an acid anhydride thereof in the absence of an inert solvent at a temperature between 35° and 100° C. throughout the pulverization process, without carrying out any extractive process with such an inert solvent, and, if necessary, by subjecting the matter obtained through such co-pulverization to heat treatment under reduced pressure and a method for carrying out homo-polymerization or copolymerization of α-olefin in the presence of a catalyst system which consists of the above mentioned titanium trichloride catalytic component and an organic aluminum compound.

DESCRIPTION OF THE PRIOR ART:

Generally a catalytic component that gives a highly crystalline olefin polymer useful for industrial purposes is a titanium trichloride composite which is activated by pulverizing an eutectic mixture obtained by reducing titanium tetrachloride with metal aluminum etc. by means of a ball mill, vibration mill or the like. However, a catalyst system that consists of such a titanium trichloride composite and an organoaluminum compound has not been satisfactory in terms of polymerization activity required for polymerization of α-olefin and also in terms of crystallinity of a polymer formed through the polymerization. The productivity of a crystalline polyolefin is a serious matter particularly for industrial purposes. For example, in cases where there is contained a great quantity of an amorphous polymer within a polyolefin produced, such an amorphous polymer of a low economic value must be recovered from the polyolefin product through an extractive process. Besides, in ordinary manufacturing processes in which a crystalline polymer is to be obtained as final product, such an amorphous polymer results in a loss of the olefin material and thus results in a great economic disadvantage.

To solve this problem, many methods for reforming such a titanium trichloride composite have recently been disclosed. In most of these reported methods, various organic compounds are employed as a third component, which is mixed with an eutectic mixture or a titanium trichloride composite and is pulverized therewith. In some of such methods, a titanium composite is reformed by pulverizing an organic acid together with an eutectic mixture. For example, Japanese patent application laying-open publications Nos. 48-66098 (or 66098-1973), and 48-70697 (or 70679-1973) and Japanese patent publication No. 49-1947 (or 1947-1974) have disclosed methods, in each of which a titanium trichloride composite is reformed by bringing it into contact with a mixture solution consisting of an organic acid and an inert solvent. Further, Japanese patent publication No. 47-26376 (or 26376-1972) has disclosed another method in which an eutectic mixture is pulverized together with an organic acid before it is brought into contact with an inert solvent.

In these methods, activity required for a catalytic component is imparted to titanium trichloride composite either by bringing it into contact with a mixture of an organic acid and an inert solvent or by bringing it into contact with an inert solvent after an organic acid and an eutectic mixture have been pulverized together. In accordance with such methods, it is needful to have contact with an inert solvent, etc. This necessitates, therefore, not only a contact effecting process and a solid-liquid separating process but also an additional process of separating and recovering such a solvent. This makes the whole process for the manufacture of a titanium trichloride catalytic component extremely complex and thus lessens the economic merit of the manufacturing process. In addition to such a manufacturing problem, the efficiency of the catalytic component obtained in such a manner can hardly be satisfactory.

SUMMARY OF THE INVENTION:

The inventors of this invention conducted studies for solution of such problems and have come to successfully develop a titanium trichloride catalyst component which excels in its efficiency as catalytic component for polymerization of α-olefin and is obtainable through a simple process of by carrying out pulverization of an organic acid or an acid anhydride thereof together with an eutictic mixture or a pulverized product thereof under specific conditions. This development has led to the present invention.

It is a general object of this invention to provide a titanium trichloride catalytic component which is manufactured by pulverizing an eutictic mixture or a crystalline compound consisting of titanium trichloride and aluminum chloride or a pulverized product thereof together with an organic acid or an acid anhydride thereof at a temperature between 35° and 100° C. in the absence of an inert solvent and without carrying out an extractive process with the inert solvent and, if necessary, by subjecting the product thus obtained through such co-pulverization to a heat treatment under reduced pressure and also to provide a method for carrying out homopolymerization or copolymerization of α-olefin in the presence of a catalyst system which consists of the above mentioned titanium trichloride catalyst component and an organoaluminum compound, for example, through a suspension polymerization process, a liquid phase polymerization process.

In the present invention, an especially important condition is temperature at which the co-pulverization process is to be carried out. In most of the conventional methods, the titanium trichloride composite and the organic acid or the like are pulverized together at ordinary temperature. As apparent from the Japanese patent publication No. 47-2637, even such co-pulverization with an organic acid has not brought about any tangible improvement in the catalytic efficiency of the product thus obtained. On the other hand, the present inventors have discovered that the catalytic efficiency can be enhanced by carrying out co-pulverization of an eutectic mixture or a pulverized matter obtained therefrom together with an organic acid or its acid anhydride thereof while keeping pulverization temperature specifically within the range of 35°–100° C. and preferably in the range of 40°–80° C. under a condition that no inert solvent is employed.

Another salient feature of the invention lies in heating treatment under reduced pressure. With such treatment, the catalytic effect of the titanium trichloride catalyst component and particularly the productivity of crystalline polymer can be increased more than several percent without allowing it to come into contact with such an inert solvent that has been employed by the conventional methods. In addition to such an effect, a part of the added organic acid or acid anhydride can be removed through such treatment.

In other words, the feature and advantage of the titanium trichloride catalytic component of the present invention are as follows: With the specific temperature used in such a manner as mentioned above, a highly effective catalytic component can be manufactured by carrying out only the co-pulverization of an organic acid and an eutectic mixture or its powder. Whereas, in the conventional methods, such a co-pulverization process alone has failed to bring about a satisfactory result. Further, in accordance with the present invention, the heating treatment under reduced pressure is additionally carried out as necessary for the manufacture of a catalytic component that permits to obtain a polyolefin of more excellent crystallinity.

It is a further advantageous feature of the invention that a polyolefin of low toxicity or no toxicity against human bodies can be manufactured by employing, as the above stated organic acid, butyric acid, caproic acid or the like that is allowed to be used as food additive by the Food Sanitation Act of Japan. Nowadays, polyolefin is being used in large quantity for food packaging containers. Therefore, the toxicity or no toxicity of various additives that remain in such polyolefin presents a grave social problem. Despite of such, however, examination of the organic compounds contained in the titanium trichloride catalyst component has been almost completely neglected. Organic acids include many compounds that are approved as food additives by the Food Sanitation Act of Japan. Such compounds are useful as the organic compound to be pulverized together with a titanium trichloride composite. However, since the conventional methods are using an inert solvent, even such an organic acid is used, it is inevitable to prevent not only the organic acid but also such an inert solvent from mixing into the catalyst component. In accordance with the conventional methods, therefore, the advantage of such organic acids that they are of low toxicity or not toxic to human bodies cannot be fully utilized.

In contrast with the conventional methods, the present invention does not use any inert solvent and any organic compounds other than the above stated organic acid or its anhydride. It is, therefore, one of the features of the present invention that a catalyst component which permit preparation of a polyolefin that is of low toxicity or not toxic to human bodies. Further details of the present invention will be understood from the following description:

The term "an eutectic mixture" as used in the present invention means an eutectic mixture or a crystalline compound which consists of titanium trichloride and aluminum chloride proximately having a composition $3TiCl_3-AlCl_3$. The eutectic mixture is manufactured by reducing titanium tetrachloride with metal aluminum by a known method, or by co-pulverizing aluminum chloride and a material which is reduced titanium tetrachloride with hydrogen.

Such an eutectic mixture or its powder is pulverized together with an organic acid or an acid anhydride by means of a pulverizer in an inert gas atmosphere such as dry nitrogen gas or the like. Pulverizers generally include rod mills, vibration mills, ball mills, etc. The present invention is not limited to one type of pulverizers but a pulverizer of any of the ordinary types may be used.

The organic acid to be used in accordance with this invention is an organic compound having at least one carboxyl group included as functional group within a molecule. For example; (1) aliphatic acid such as acetic acid, propionic acid, butyric acid, isobutyric acid, valeric acid, isovaleric acid, pivalic acid, caproic acid, enanthic acid, caprylic acid, pelargonic acid, carpric acid, acrylic acid, methacrylic acid, crotonic acid, oleic acid, linoleic acid, linolenic acid, etc.; (2) alicyclic acid such as cyclohexanic acid, cycloheptanic acid, etc.; (3) aromatic acid such as benzoic acid, toluic acid, phenylacetic acid, cinnamic acid, etc.; (4) halogeno acid such as fluoroacetic acid, chloroacetic acid, dichloro-acetic acid, trichloacetic acid, bromoacetic acid, iodoacetic acid, chloropropionic acid, chlorobutyric acid, etc.; (5) hydroxy acid such as glycollic acid, hydroxypropanic acid, hydroxybutanoic acid, hydroxypentanoic acid, hydroxyhexanoic acid, hydroxyheptanoic acid, etc.; (6) aldehyde acid such as glyoxylic acid, etc.; (7) keto acid such as pyruvic acid, acetoacetic acid, levulinic acid, etc.; (8) polycarboxyl acid such as oxalic acid, malonic acid, succinic acid, glutaric acid, malic acid, tartaric acid, asparagine, glutamic acid, oxaloacetic acid, fumaric acid, maleic acid, tricarballylic acid, citric acid, etc.; and the like, are usable as such an organic acid. Further, an acid anhydride of the organic acid usable in accordance with the invention is a compound that is in a state in which water of one molecule is lost from one or two molecules of carboxylic acid and two acyl groups are bonded together with an oxygen atom interposed between them. For example acetic anhydride, propionic anhydride, butyric anhydride, valeric anhydride, capric anhydride, enanthic anhydride, carprylic anhydride, carprinic anhydride, benzoic anhydride, toluic anhydride, succinic anhydride, etc. are usable as such acid anhydride. In accordance with the invention, either one kind of such organic acids or such acid anhydride may be used singly or two or more than two kinds of them may be used in combination.

The quantity of the organic acid or its anhydride to be mixed with the eutectic mixture or its powder is 2–20 parts by weight or preferably 5–18 parts by weight to 100 of the eutectic mixture or its powder. The use of the organic acid or its anhydride in great quantity exceeding this range does not bring about a particularly greater effect while the use of it in quantity less than 2 parts by weight does not bring about any sufficient effect.

The temperature to be set for the co-pulverization process is one of the important operating conditions for the present invention. The co-pulverization temperature is set within the range of 35° to 100° C. and preferably 40° to 80° C. Co-pulverization at a high temperature exceeding 100° C. lowers the catalytic efficiency of the catalyst component to a great degree. On the other hand, pulverization at a temperature lower than 35° C. requires a longer period of time for completion of the pulverizing process and this not only lowers productivity but also often makes it impossible to attain a desired effect. However, during the initial stage of the co-pulverization process, pulverization may be carried out at ordinary temperature to 35° C. until the initial period of time after the start of the process reaches 30 to 40% of the total length of time required for the process.

The length of time required for co-pulverization varies with the type of the pulverizer and its operating conditions, such as, in the case of a vibration mill for example, vibration frequency, amplitude, ball diameter, ball weight and ball filling quantity and also varies with the filling quantity and temperature of the eutectic mixture or its power. Such co-pulverization must be continued at least until the $\alpha$-, $\beta$- or $\gamma$-configuration of the crystal form of the eutectic mixture or its powder disappears from an X-ray diffraction chart thereof.

In cases where the catalytic efficiency must be further enhanced or where the organic acid or the acid anhydride which is added must be removed, it is preferable to carry out a heating treatment under reduced pressure. For this treatment, a preferable degree of pressure reduction is in the range of 1–760 mmHg in absolute pressure and preferable temperature is within the range of 30°–120° C. With the temperature lower than 30° C., a longer period of time is required for completion of the treatment. Treatment at temperature higher than 120° C. results in a sudden decrease in efficiency as catalytic component. With the degree of pressure reduction and the temperature set within the above stated ranges respectively, the length of time required for the treatment ranges from 0.1 to 20 hours. Although no restriction is imposed on the manner in which such heating under reduced pressure is to be carried out, it is preferable that the treatment is carried out with thorough stirring.

The titanium trichloride catalytic component manufactured in the above stated manner is used to form an $\alpha$-olefin polymerizing catalyst system in combination with an organoaluminum compound expressed by a generic formula: $AlR_nX_{3-n}$ (wherein $0 < n \leq 3$; R represents hydrocarbon residue; and X represents halogen). Such an organoaluminum compound is selected, for example, from trimethyl aluminum, triethyl aluminum, tri-n-propyl aluminum, tri-n-butyl aluminum, triisobutyl aluminum, tri-n-hexyl aluminum, tri-z-pentyl aluminum, tri-n-octyl aluminum, tri-n-decyl aluminum, tri-n-dodecyl aluminum, tri-n-hexadecyl aluminum, diethyl aluminum chloride, di-n-propyl aluminum chloride, diisobutyl aluminum chloride, methyl aluminum sesquichloride, ethyl aluminum dichloride, isobutyl aluminum dichloride, diethyl aluminum iodide, diethyl aluminum hydride, diisobutyl aluminum hydride, etc.;

The quantitative ratio of the titanium trichloride catalytic component and the organoaluminum compound can be selected out of a wide range and thus can be arbitrarily determined by those skilled in the art. Normally, however, a molar ratio within the range of 1:1–20 is deemed to be suitable. Further, in practicing the invented $\alpha$-olefin polymerizing method, an electron donor that is generally employed in such a catalyst system may be used in combination with the titanium trichloride catalytic component and the organoaluminum compound.

The invented polymerization method may be carried out by a suspension polymerization process in which an inert hydrocarbon selected from aromatic hydrocarbons such as benzene, toluene, xylene, etc., aliphatic hydrocarbons such as heptane, hexane, octane, etc. and alicyclic hydrocarbons such as cyclohexane, cycloheptane, etc. may be employed as solvent; by a liquid phase polymerization process employing a liquefied monomer as solvent; or by a gas phase polymerization process in which a monomer is present in a gas phase.

As for the mode of the polymerization operation, either a continuous operation or a batch operation may be employed. Polymerization temperature is in the range of 30°–120° C. and preferably 50°–100° C. Polymerization pressure is in the range from atmospheric pressure to 100 atm and preferably atmospheric pressure to 50 atm.

The $\alpha$-olefin to be homopolymerized or copolymerized using the catalyst system of the invention is ethylene, propylene, 1-butene, 4-methyl pentene, etc. The molecular weight adjustment may be effected by means of diethyl zinc in accordance with a known method.

DETAILED DESCRIPTION OF THE PREFERRED EMBODIMENTS

The invention will be more clearly understood with reference to the following examples of embodiment. However, these examples are intended to illustrate the invention and are not to be construed to limit the scope of the invention.

EXAMPLE 1.

(1) Manufacture of Titanium Trichloride Catalytic Component:

120 g of an eutectic mixture which is manufactured by reducing titanium tetrachloride with aluminum powder in the presence of aluminum chloride in accordance with a known method and which is of composition proximately $3TiCl_3 \cdot AlCl_3$ is placed in a jacketed vibration mill the inside of which has been replaced with dry nitrogen gas. The mill measures 1.2 liters in inside volume and is filled with 4.5 kg of steel balls each measuring ½ inch in diameter. The eutectic mixture is pulverized at room temperature for one hour. Then, 12 g of n-caproic acid employed as organic acid and is put into the vibration mill under the dry nitrogen gas atmosphere to pulverize it together with the eutectic mixture at a temperature of 60° C. for four hours. A titanium trichloride catalytic component is obtained through this pulverization process. The addition quantity of the caproic acid is to 10 parts by weight to 100 of the titanium trichloride composite.

(2) Polymerization:

Using a stainless steel autoclave which measures 2 liters in inside volume and the inside of which is replaced with dry nitrogen gas, 160 mg of the titanium trichloride catalytic component which has been obtained by the above stated manufacturing process, 5 mmol of diethyl aluminum monochloride and 1000 ml of dry n-heptane are put in the autoclave and in the dry nitrogen gas atmosphere. Further, 5 mmol of hydrogen gas is introduced into the autoclave and heating is carried out to make the inside temperature of the autoclave up to 70° C. Following this, propylene is supplied into the autoclave with pressure to allow polymerization reaction to proceed for four hours while maintaining the inside temperature and inside pressure of the autoclave at 70° C. and 10 kg/cm$^2$-G respectively.

Upon completion of polymerization reaction, propylene gas existing inside the autoclave is purged and 100 ml of methanol is injected to decompose the catalytic component. A suspension of the polymer product is filtrated. The cake which is obtained by filtration is washed with a mixture solution consisting of isopropanol and methanol in the ratio of 1:3. The cake is then dried under reduced pressure to obtain a dry solid polymer. On the other hand, a soluble polymer which is dissolved in the polymerization solvent is collected by evaporating and solidifying the solvent.

Using a Soxhlet's extractor, the dry solid polymer is subjected to an extraction process with boiling n-heptane for 24 hours to divide it into a polymer which is insoluble in boiling n-heptane and a polymer which is soluble therein.

The quantity of the polymer product per unit weight of the catalytic component (hereinafter will be called rate of polymer formation and will be expressed in g-pp/g-cat) is 1840. The ratio of formation of the n-heptane insoluble solid polymer to the total quantity of the polymer product (hereinafter will be called I.I and will be expressed in % by weight) is 96.9.

EXAMPLES 2-12:

While 10 parts by weight of n-caproic acid is employed as organic acid in Example 1, various organic acids or the acid anhydrides thereof are used in Examples 2-12 in various parts by weight as shown in Table 1. Except this, the titanium trichloride catalytic component is manufactured and polymerization of propylene is carried out exactly in the same manner as in Example 1. The results are as shown in Table 1 below:

Table 1.

| Ex. No. | Organic acid or acid anhydride | Temp. (°C.) | Addition quantity (part by weight) | Productivity of Polymer (g-pp/g-cat) | I.I (%) |
|---|---|---|---|---|---|
| 2 | n-butyric acid | 60 | 10 | 2142 | 96.8 |
| 3 | isocaproic acid | " | 15 | 2210 | 96.7 |
| 4 | acrylic acid | " | 10 | 2040 | 96.6 |
| 5 | dl-malic acid | " | " | 1522 | 90.7 |
| 6 | dl-tartaric acid | " | " | 1668 | 90.4 |
| 7 | fumaric acid | 60 | 10 | 1593 | 89.3 |
| 8 | benzoic acid | " | " | 1658 | 89.9 |
| 9 | succinic acid | " | " | 1225 | 90.6 |
| 10 | acetic acid | " | " | 1216 | 90.1 |
| 11 | butyric acid anhydride | " | " | 2080 | 96.2 |
| 12 | caproic acid anhydride | " | " | 2146 | 95.9 |

EXAMPLE 13-24:

With the exception of that the addition quantity of caproic acid, butylic acid and acrylic acid used as organic acid is arranged to be parts by weight as shown in Table 2, the titanium trichloride catalytic component is manufactured and polymerization of propylene is carried out exactly in the same manner as in Example 1. The results are as shown in Table 2 below:

Table 2.

| Example No. | Organic acid or acid anhydride | Temp. (°C.) | Addition quantity (part by weight) | Productivity of Polymer (g-pp/g-cat) | I.I (%) |
|---|---|---|---|---|---|
| 13 | n-caproic acid | 60 | 2 | 1799 | 89.3 |
| 14 | n-caproic acid | " | 5 | 1930 | 91.0 |
| 15 | n-caproic acid | " | 18 | 1400 | 89.0 |
| 16 | n-caproic acid | " | 20 | 1107 | 95.5 |
| 17 | iso-butyric acid | " | 2 | 1009 | 90 |
| 18 | iso-butyric acid | " | 5 | 1990 | 91.6 |

Table 2.-continued

| Example No. | Organic acid or acid anhydride | Temp. (°C.) | Addition quantity (part by weight) | Productivity of Polymer (g-pp/g-cat) | I.I (%) |
|---|---|---|---|---|---|
| 19 | iso-butyric acid | " | 18 | 1407 | 94.9 |
| 20 | iso-butyric acid | " | 20 | 1319 | 96.5 |
| 21 | acrylic acid | " | 2 | 1310 | 90.1 |
| 22 | acrylic acid | " | 5 | 1695 | 92.6 |
| 23 | acrylic acid | " | 18 | 1448 | 94.1 |
| 24 | acrylic acid | " | 20 | 1230 | 90.3 |

REFERENCE EXAMPLES 1-5 (for comparison):

The titanium trichloride catalyst component is manufactured in exactly the same manner as in Example 1 except that the titanium trichloride composite is either pulverized without adding any organic acid thereto or pulverized together with caproic acid or butyric acid which is added thereto in ratio by weight as shown in Table 3. Then propylene is polymerized and the results are as shown also in Table 3 below:

Table 3.

| Ref. example No. | Organic acid or acid anhydride | Temp. (° C.) | Addition quantity (part by weight) | Productivity of polymer (g-pp/g-cat) | I.I (%) |
|---|---|---|---|---|---|
| 1 | — | 60 | — | 1100 | 89.5 |
| 2 | n-caproic acid | " | 23 | 827 | 92.3 |
| 3 | " | " | 1 | 1015 | 89.9 |
| 4 | n-butyric acid | " | 24 | 820 | 91.8 |
| 5 | " | " | 0.5 | 1109 | 88.9 |

EXAMPLES 25-28:

The titanium trichloride catalytic component is manufactured in exactly the same manner as in Example 1 except that 10 parts by weight of butyric acid is used as organic acid and co-pulverization is carried out at different temperatures as shown in Table 4. Then propylene is polymerized as shown also in Table 4.

Table 4.

| Example No. | Organic acid or acid anhydride | Temp. (° C.) | Addition quantity (part by weight) | Productivity of polymer (g-pp/g-cat) | I.I (%) |
|---|---|---|---|---|---|
| 25 | n-butyric acid | 35 | 10 | 1350 | 90.8 |
| 26 | " | 40 | " | 1708 | 92.3 |
| 27 | " | 80 | " | 1776 | 94.1 |
| 28 | " | 100 | " | 1290 | 91.6 |

REFERENCE EXAMPLES 6-8 (for comparison)

The titanium trichloride catalytic component is manufactured in exactly the same manner as in Example 1 except that acrylic acid or acetic acid is used in quantity 10 parts by weight and co-pulverization is carried out while keeping temperature at different values indicated in Table 5. Then, propylene is polymerized to obtain results as shown in Table 5 below:

Table 5.

| Ref. example No. | Organic acid or acid anhydride | Temp. (°C.) | Addition quantity (part by weight) | Productivity of polymer (g-pp/g-cat) | I.I (%) |
|---|---|---|---|---|---|
| 6 | Acrylic acid | 120 | 10 | 927 | 74 |
| 7 | Acrylic acid | 25 | " | 1039 | 91 |
| 8 | Acetic acid | 25 | " | 704 | 82 |

EXAMPLE 29:

Using an eutectic mixture which consists of titanium trichloride and aluminum chloride and the composition of which is proximately $3TiCl_3.AlCl_3$, 120 g of the eutectic mixture and 12 g of n-caproic acid which is employed as organic acid are placed in a ball mill the inside of which is replaced with dry nitrogen gas and which measures 1.8 liters in inside volume. The ball mill is filled with 4.5 kg of steel balls each measuring ½ inch in diameter. Then, a titanium trichloride catalytic component is obtained by carrying out co-pulverization at a temperature of 50° C. for 16 hours.

The polymerization of propylene is carried out in exactly the same manner as in Example 1. The rate of polymer formation is 1230 and I.I is 91.1.

EXAMPLES 30-32:

The titanium trichloride catalytic component manufactured in each of the foregoing examples is subjected to heating under reduced pressure and under the conditions shown in Table 6. Then, polymerization of propylene is carried out in exactly the same manner as in Example 1. The results are as shown also in Table 6 which clearly show improvement attained particularly in I.I Table 6.

| Ex. No. | Catalytic component heat treated | Reduced pressure heating conditions | | | Productivity of polymer (g-pp/g-cat) | I.I (%) |
|---|---|---|---|---|---|---|
| | | Absolute pres. (mmHg) | Temp. (°C.) | Time (hr) | | |
| 30 | Catalytic component of Ex. 1 | 7 | 50 | 3 | 1825 | 98.4 |
| 31 | Catalytic component of Ex. 2 | 4 | " | " | 2059 | 98.0 |
| 32 | Catalytic component of Ex. 4 | 7 | " | " | 1950 | 97.8 |

EXAMPLE 33

First, 120 g of an eutectic mixture of composition which is proximately $3TiCl_3.AlCl_3$ and is manufactured by reducing titanium tetrachloride in the presence of aluminum and 18 g of n-butyric acid which is employed as organic acid are placed in a jacketed vibration mill which measures 1.2 liters in inside volume and is filled with steel balls each measuring ½ inch in diameter. Then, they are pulverized together at 70° C. for four hours to obtain a titanium trichloride catalytic component. Using this catalytic component, polymerization of propylene is carried out in exactly the same manner as in Example 1. The rate of polymer formation is 2294 and I.I 95.9.

Further, the same catalytic component is reformed by subjecting it to heating treatment at 70° C. for two hours under reduced pressure of 5 mmHg in absolute pressure. Then, using the reformed catalytic component, polymerization of propylene is carried out also in exactly the same manner as in Example 1. The rate of polymer formation is 2230 while I.I is 97.4.

EXAMPLE 34

First, 160 mg of titanium trichloride catalytic component obtained in Example 3 and 5 mmol of diethyl aluminum monochloride are placed in a stainless steel autoclave which measures 2 liters in inside volume and the inside of which is replaced with dry nitrogen gas. Then, 580 g of liquefied propylene which has been measured beforehand is put into the autoclave with pressure using nitrogen gas. At the same time, the autoclave is immersed in a water tank which has been heated up to about 65° C. A polymerization reaction is carried out for one hour while keeping the inside temperature of the autoclave at 70° C.

Upon completion of the reaction, the same process as in Example 1 is carried out. The rate of polymer formation is 2140 and I.I 98.1.

Example 35

Copolymerization of ethylene and propylene is carried out using the titanium trichloride catalytic component obtained in Example 3 in the following manner: 0.16 mg of the titanium trichloride catalytic component and 5 mmol of diethyl aluminum chloride are placed in a stainless steel autoclave of 2 liters containing 1 liter of n-heptane used as polymerization solvent. Following this, temperature inside the autoclave is adjusted to 70° C. and pressure inside it is kept at 3 kg/cm² by introducing into it a mixture gas consisting of propylene and ethylene (ethylene content being 10 mol %). The copolymerization is considered to begin at the time of introduction of the mixture gas. The temperature is kept at 70° C. throughout the copolymerization process. The supply of the mixture gas is stopped four hours after beginning of copolymerization and the mixture gas is purged from the reaction system.

Upon completion of the reaction, the same process as in Example 1 is carried out. The rate of polymer formation is 1633 and I.I 76.4.

EXAMPLES 36-37

While 10 parts by weight of n-carproic acid is employed as organic acid in Example 1, various organic acids thereof are use in Example 36-37 in various parts by weight as shown in Table 7. Except this, the titanium trichloride catalytic component is manufactured and polymerization of propylene is carried out exactly in the same manner as in Example 1. The results are as shown in Table 7 below:

Table 7.

| Example No. | Organic acid | Temp. (° C.) | Addition quantity (part by weight) | Productivity of polymer (g-pp/g-cat) | I.I (%) |
|---|---|---|---|---|---|
| 36 | Cyclohexanid acid | 60 | 15 | 2324 | 95.3 |
| 37 | Chloropropionic acid | 60 | 15 | 2237 | 94.8 |

What is claimed is:

1. A titanium trichloride catalytic component manufactured by pulverizing an eutectic mixture or a crystalline compound consisting of titanium trichloride and aluminum chloride or a pulverized matter obtained therefrom, together with 2-20 parts by weight per 100 parts of said eutectic mixture, crystalline compound or matter obtained therefrom, of an organic compound selected from the group consisting of a carboxylic acid and an anhydride thereof at a temperature within the range of 35°-100° C. in the absence of a solvent and without an extractive process carried out with said solvent.

2. A titanium trichloride catalytic component according to claim 1 wherein a matter obtained through said co-pulverization process is subjected to a heat treatment at a temperature of up to 120° C. and under reduced pressure.

3. A titanium trichloride catalytic compound according to claim 1 wherein said acid anhydride of the carboxylic acid is the anhydride of a monocarboxylic acid.

4. A titanium trichloride catalytic compound according to claim 1 wherein the temperature of said co-pulverization process is within a range from 40° to 80° C.

5. A titanium trichloride catalytic compound according to claim 1, wherein said an eutectic mixture or crystalline compound is obtained by reducing titanum tetrachloride with metal aluminum in the presence of aluminum chloride.

6. A titanium trichloride catalytic compound according to claim 1, wherein said an eutectic mixture or a crystalline compound is obtained by pulverizing an eutectic mixture which is obtained by reducing titanium tetrachloride with metal aluminum in the presence of aluminum chloride.

7. A titanium trichloride catalytic compound according to claim 1, wherein said an eutectic mixture or crystalline compound is a solid solution which is obtained by reducing titanium tetrachloride with hydrogen or metal aluminum, admixing the titanium trichloride with aluminum chloride, and pulverizing the result mixture.

8. A titanium trichloride catalytic compound according to claim 1, wherein said carboxylic acid is at least one aliphatic acid selected from the group consisting of acetic acid, propionic acid, butyric acid, isobutyric acid, valeric acid, isovaleric acid, pivalic acid, caproic acid, enanthic acid, caprylic acid, pelargonic acid, carpric acid, acrylic acid, methacrylic acid, crotonic acid, oleic acid, linoleic acid, linolenic acid.

9. A titanium trichloride catalytic compound according to claim 1, wherein said carboxylic acid is at least one alicyclic acid selected from the group consisting of cyclohexanic acid, cycloheptanic acid.

10. A titanium trichloride catalytic compound according to claim 1, wherein said carboxylic acid is at least one aromatic acid selected from the group consisting of benzoic acid, toluic acid, phenylacetic acid, cinnamic acid.

11. A titanium trichloride catalytic compound according to claim 1, wherein said carboxylic acid is at least one halogeno acid selected from the group consisting of fluoroacetic acid, chloroacetic acid, dichloroacetic acid, trichloroacetic acid, bromoacetic acid, iodoacetic acid, chloropropionic acid, chlorobutyric acid.

12. A titanium trichloride catalytic compound according to claim 1, wherein said carboxylic acid is at least one hydroxy acid selected from the group consisting of glycollic acid, hydroxypropanoic acid, hydroxybutanoic acid, hydroxypentanoic acid, hydroxyhexanoic acid, hydroxyheptanoic acid.

13. A titanium trichloride catalytic compound according to claim 1, wherein said carboxylic acid is at least one aldehyde acid selected from the group consisting of glyoxylic acid.

14. A titanium trichloride catalytic compound according to claim 1, wherein said carboxylic acid is at least one keto acid selected from the group consisting of pyruvic acid, acetoacetic acid, levulinic acid.

15. A titanium trichloride catalytic compound according to claim 1, wherein said carboxylic acid is at least one polycarboxyl acid selected from the group consisting of oxalic acid, malonic acid, succinic acid, glutaric acid, maleic acid, tartaric acid, asparagine, glutamic acid, oxaloacetic acid, fumaric acid, maleic acid, tricarballylic acid, citric acid.

16. A titanium trichloride catalytic compound according to claim 1, wherein said acid anhydride is at least one acid anhydride selected from the group consisting of acetic anhydride, propionic anhydride, butyric anhydride, valeric anhydride, capric anhydride, enanthic anhydride, carprylic anhydride, carprinic anhydride, benzoic anhydride, toluic anhydride, succinic anhydride.

17. A titanium trichloride catalytic compound according to claim 2, wherein the temperature range of said heating treatment is from 30° to 120° C.

18. A titanium trichloride catalytic compound according to claim 2, wherein the reduced pressure range at heating treatment is from 1 to 760 mmHg in absolute pressure.

* * * * *

UNITED STATES PATENT AND TRADEMARK OFFICE
CERTIFICATE OF CORRECTION

PATENT NO. : 4,222,894
DATED : September 16, 1980
INVENTOR(S) : TAKAHASHI ET AL

It is certified that error appears in the above-identified patent and that said Letters Patent are hereby corrected as shown below:

In Column 12, line 32, "maleic" should read --malic--.

Signed and Sealed this

Third Day of March 1981

[SEAL]

Attest:

RENE D. TEGTMEYER

Attesting Officer

Acting Commissioner of Patents and Trademarks